United States Patent
Kuhl et al.

(10) Patent No.: US 10,948,070 B2
(45) Date of Patent: Mar. 16, 2021

(54) ELECTRIC MACHINE LUBRICATION SYSTEM

(71) Applicant: DEERE & COMPANY, Moline, IL (US)

(72) Inventors: Marcus L. Kuhl, Cedar Falls, IA (US); Clayton P. Neumann, Cedar Falls, IA (US); Matthew B. Winhold, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 122 days.

(21) Appl. No.: 16/188,999

(22) Filed: Nov. 13, 2018

(65) Prior Publication Data

US 2020/0149622 A1 May 14, 2020

(51) Int. Cl.
| | |
|---|---|
| *B60K 11/06* | (2006.01) |
| *F16H 57/04* | (2010.01) |
| *F01M 1/02* | (2006.01) |
| *F01M 11/00* | (2006.01) |

(52) U.S. Cl.
CPC .......... *F16H 57/0412* (2013.01); *F01M 1/02* (2013.01); *F01M 11/0004* (2013.01); *F16H 57/0436* (2013.01); *F01M 2001/0215* (2013.01); *F01P 2060/045* (2013.01)

(58) Field of Classification Search
CPC ....... B60K 1/00; B60K 17/28; F16H 57/0412; F16H 57/0436; F16H 57/0435; F16H 57/0476; F16H 57/0423; F16H 57/045; F16H 3/727; F16H 57/0441; B60Y 2200/221; F01P 2060/045; F01M 2001/021; F01M 1/02; F01M 11/0004
USPC .............................................. 180/339
See application file for complete search history.

(56) References Cited

U.S. PATENT DOCUMENTS

| | | | |
|---|---|---|---|
| 6,371,158 B1 | 4/2002 | Hou et al. | |
| 8,522,913 B2 | 9/2013 | Mussoi et al. | |
| 2010/0228457 A1 | 9/2010 | Reiter et al. | |
| 2011/0166727 A1* | 7/2011 | Light ................... | B60W 10/30 701/22 |
| 2011/0269593 A1 | 11/2011 | Knowles et al. | |
| 2013/0125995 A1* | 5/2013 | Long ..................... | B60K 6/48 137/1 |
| 2014/0174856 A1* | 6/2014 | Takagi ................. | B60K 6/445 184/6.12 |

(Continued)

*Primary Examiner* — Toan C To
(74) *Attorney, Agent, or Firm* — Taft Stettinius & Hollister LLP; Stephen F. Rost (57) ABSTRACT

An electric drive for a transmission having a housing, a pump drive, and a primary sump configured to hold oil and operatively connected to a vehicle engine. The electric drive includes an oil-cooled electric generator electrically connected to an oil-cooled electric motor by an inverter. The electric generator includes a generator oil output operatively connected to and configured to deliver a flow of oil to a secondary sump located in the housing. The electric motor includes a motor oil output operatively connected to and configured to deliver a flow to the secondary sump. The secondary sump is separate from the primary sump, wherein the oil from the secondary sump is pumped back into the lubrication circuit of the transmission. The secondary sump includes a feature to allow overflow to drain to the primary sump.

20 Claims, 7 Drawing Sheets

(56) References Cited

U.S. PATENT DOCUMENTS

| | | | |
|---|---|---|---|
| 2015/0239332 A1* | 8/2015 | Okuda | B60K 6/40 |
| | | | 60/716 |
| 2017/0114886 A1* | 4/2017 | Matsushita | B60K 6/405 |
| 2017/0219085 A1* | 8/2017 | Kiyokami | F01M 1/02 |
| 2019/0113135 A1* | 4/2019 | Miyamoto | F25B 45/00 |
| 2020/0063614 A1* | 2/2020 | Dudar | B60L 53/12 |
| 2020/0164856 A1* | 5/2020 | Kamiya | B60L 1/003 |

* cited by examiner

ELECTRIC MACHINE LUBRICATION SYSTEM

FIELD OF THE DISCLOSURE

The present invention generally relates to an electric machine for a transmission of a work vehicle, and more particularly to a lubrication system including an electric machine of a transmission work vehicle.

BACKGROUND

Work vehicles are configured to perform a wide variety of tasks for use such as construction vehicles, forestry vehicles, lawn maintenance vehicles, as well as on-road vehicles such as those used to plow snow, spread salt, or vehicles with towing capability. Additionally, work vehicles include agricultural vehicles, such as a tractor or a self-propelled combine-harvester, which include a prime mover that generates power to perform work. In the case of a tractor, for instance, the prime mover is often a diesel engine that generates power from a supply of diesel fuel. The diesel engine drives a transmission which moves wheels or treads to propel the tractor across a field. Tractors often include a power takeoff (PTO) which includes a shaft coupled to the transmission and driven by the engine to provide mechanical power to a work implement being pulled or pushed through a field by the tractor.

The PTO that extends from the tractor to the implement is directly coupled to the implement to drive an operation being performed by the implement. In different embodiments, the implements include a spreader, a rotary mower, a rotary tiller, and other types of implements. The implement receives rotary power from the PTO to drive the operation of the particular implement to which the tractor is connected.

Work vehicles are made to incorporate different types of transmissions based on cost as well as intended applications of the work vehicle. Transmissions includes both manual transmission and automatic transmissions. Automatic transmissions includes what is known as a "conventional" transmission, that shifts between discrete individual gears, and a continuously variable transmission (CVT) that changes gears through a continuous range of gear ratios. A subset of a CVT is known as an infinitely variable transmission (IVT). In CVTs and particularly IVTs, the transmission can include a motor used to control the speed of the transmission. The motor, due to the work it performs can become excessively hot during operation and requires a cooling system. Known cooling systems, however, can be insufficient to provide proper cooling. What is needed therefore is an apparatus configured to provide sufficient cooling during operation of the transmission.

SUMMARY

Electric machines require substantial cooling flow to optimize power density. A traditional approach to this would be sizing a lubrication pump to provide sufficient cooling flow to the electric machine and then allowing the cooling flow to drain to the primary sump. The present disclosure describes a method and apparatus for draining the electric machine flow to a secondary sump, where the fluid is then pumped back into the lubrication circuit either before or after an oil cooler. The secondary sump has an overflow feature to allow overflow to drain to the primary sump. Doing this, minimizes the need to increase the size of the main lubrication pump.

In one embodiment there is provided an electric drive for a transmission operatively connected to a vehicle engine. The electric drive includes an oil-cooled electric generator and an oil cooled electric motor. The electric generator includes an input drive configured to be driven by the engine, an electrical output configured to provide generator electrical power, and a generator oil output configured to deliver a flow of oil from the electrical generator. The oil-cooled electric motor includes a motor input, a motor driver configured to provide a mechanical power, and a motor oil output configured to deliver a flow of oil from the electric motor. A housing includes a first aperture operatively connected to the generator oil output and a second aperture operatively connected to the motor output, wherein the housing includes a chamber, operatively connected to the first aperture and to the second aperture, and a chamber output operatively connected to a pump drive, wherein the pump drive is configured to drive one or more pumps.

In one example of this embodiment, the electric drive includes an inverter having an inverter electrical input and an inverter electrical output, wherein the inverter converts the generator electrical power to inverter electrical power, and the inverter electrical output is operatively connected to the electric motor to provide inverter electrical power to the electric motor. In a second example, the electric motor includes a drive shaft configured to be operatively connected to the transmission, wherein a rotational speed of the drive shaft provides a speed control for the transmission. In a third example, the housing defines a cavity in which the chamber is located, wherein the chamber defines a primary sump and the cavity defines a secondary sump. In a fourth example, the housing includes an interior wall and an exterior wall, and further comprises a cover fixedly connected to the interior wall to define the secondary sump.

In a fifth example, the interior wall of the housing includes a rib and the cover is fixedly connected to the rib to define the secondary sump. In a sixth example, the rib and the cover define an opening, wherein the opening is configured to provide for the release of oil from the generator oil output and motor oil output into the cavity. In a seventh example, the rib and the cover define a substantially fluid tight seal configured to direct the generator oil output and the motor oil output to a collection location of the secondary sump. In an eighth example, the electric drive includes a conduit operatively connected to the secondary sump at the collection location, wherein the conduit is configured to direct the collected oil from the sump.

In another embodiment there is provided a work vehicle including an engine, a transmission operatively connected to the engine, wherein the transmission includes a housing having a first aperture, a second aperture, and a chamber. An electric drive is operatively connected to the housing and includes an oil-cooled electric generator and an oil cooled electric motor. The electric generator includes an input drive configured to be driven by the engine, an electrical output configured to provide generator electrical power, and a generator oil output configured to deliver a flow of oil from the electric generator. The oil-cooled electric motor includes a motor input, a motor driver configured to provide mechanical power, and a motor oil output configured to deliver a flow of oil from the electric motor; wherein the first aperture is operatively connected to the generator oil output and the second aperture is operatively connected to the motor output. The chamber is operatively connected to the first aperture and to the second aperture, and a chamber output is operatively connected to a pump drive, wherein the pump drive is configured to drive one or more pumps.

In one example of this embodiment, the electric drive includes an inverter having an inverter electrical input and an inverter electrical output, wherein the inverter converts the generator electrical power to inverter electrical power and the inverter electrical output is operatively connected to the electric motor to provide inverter electrical power to the electric motor. In a second example, the electric motor includes a drive shaft configured to be operatively connected to the transmission, wherein a rotational speed of the drive shaft provides a speed control for the transmission. In a third example, the housing defines a cavity in which the chamber is located, wherein the chamber defines a primary sump and the cavity defines a secondary sump. In a fourth example, the housing includes an interior wall and an exterior wall, and further comprises a cover fixedly connected to the interior wall to define the secondary sump.

In a fifth example, the interior wall of the housing includes a rib and the cover is fixedly connected to the rib to define the secondary sump. In a sixth example, the rib and the cover define an opening, wherein the opening is configured to provide for the release of oil from the generator oil output and motor oil output into the cavity. In a seventh example, the rib and the cover define a substantially fluid tight seal configured to direct the generator oil output and the motor oil output to a collection location of the secondary sump. In an eighth example, the electric drive includes a conduit operatively connected to the secondary sump at the collection location, wherein the conduit is configured to direct the collected oil from the sump.

In a further embodiment there is provided a method for controlling the speed of an infinitely variable transmission having a housing, a pump drive, and a primary sump configured to hold oil. The method includes: providing an oil cooled electric generator operatively connected to the housing and an oil cooled motor operatively connected to the housing, the electric generator having a generator oil output configured to deliver a flow of oil from the electric generator to the housing and an electrical output operatively connected to the oil cooled motor, the oil-cooled electric motor having a motor oil output configured to deliver a flow of oil from the electric motor and a drive shaft extending into the housing; connecting the generator oil output to a first aperture of the housing and connecting the motor oil output to a second aperture of the housing; providing a chamber within the housing operatively connected to the first aperture and to the second aperture, the chamber including a chamber output operatively connected to the pump drive; delivering a flow of oil into the chamber from the first aperture and the second aperture, wherein the delivered flow of oil is separated from primary sump; and controlling the speed of the drive shaft to control the speed of the infinitely variable transmission.

In one example of this embodiment, the method further includes releasing a portion of the oil from the chamber into the primary sump during operation of the infinitely variable transmission.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Figure 1:
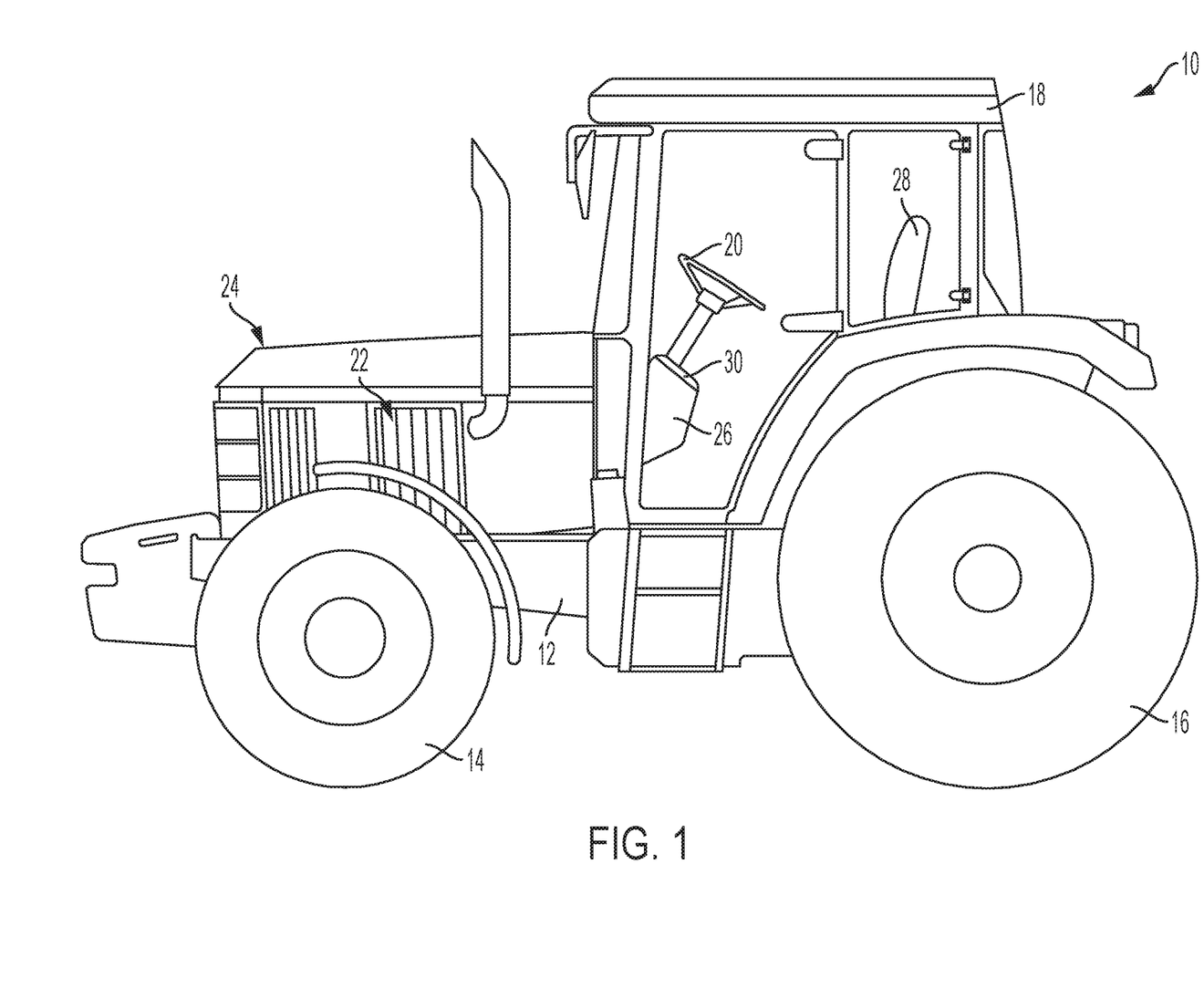
FIG. 1 is an elevational side view of a work vehicle, and more specifically, of an agricultural vehicle such as a tractor.

FIG. 1 is an elevational side view of an agricultural vehicle, and more particularly a tractor 10, including a frame 12 supported on a pair of front wheels 14 and a set of rear wheels 16. While wheels are described in the embodiments, other ground engaging traction devices including tracks are contemplated. An operator cab 18 is mounted on the frame 12 and contains various controls for the vehicle 10 so as to be within the reach of a seated or standing operator. In one aspect, these controls may include a steering device, such as a steering wheel 20. A prime mover 22, such as an engine, is mounted on the frame 12 beneath a housing 24 and supplies power for driven components of the tractor 10. The engine 22, for example, is configured to drive a transmission (not shown), which is coupled to drive the wheels at various selected speeds and either in forward or reverse directions. In different embodiments, the front wheels, the rear wheels, or all of the wheels are driven in an all-wheel drive mode to move the tractor 10.

While the described embodiments are discussed with reference to a tractor, in addition to agricultural vehicles, other work vehicles are contemplated including construction vehicles, forestry vehicles, lawn maintenance vehicles, as well as on-road vehicles such as those used to plow snow, spread salt, or vehicles with towing capability.

The cab 18 defines an operator workstation 26, which is supported by the frame 12. The cab 18 also encloses a seat 28 for seating the operator. The operator workstation 26, in different embodiments, includes one or more of an operator user interface 30 including, but not limited to, a joystick, an accelerator pedal, and a power take-off (PTO) control device for turning on or off the PTO. Pedals for a brake and a clutch are also located in the cabin 18, but are not shown.

Figure 2:
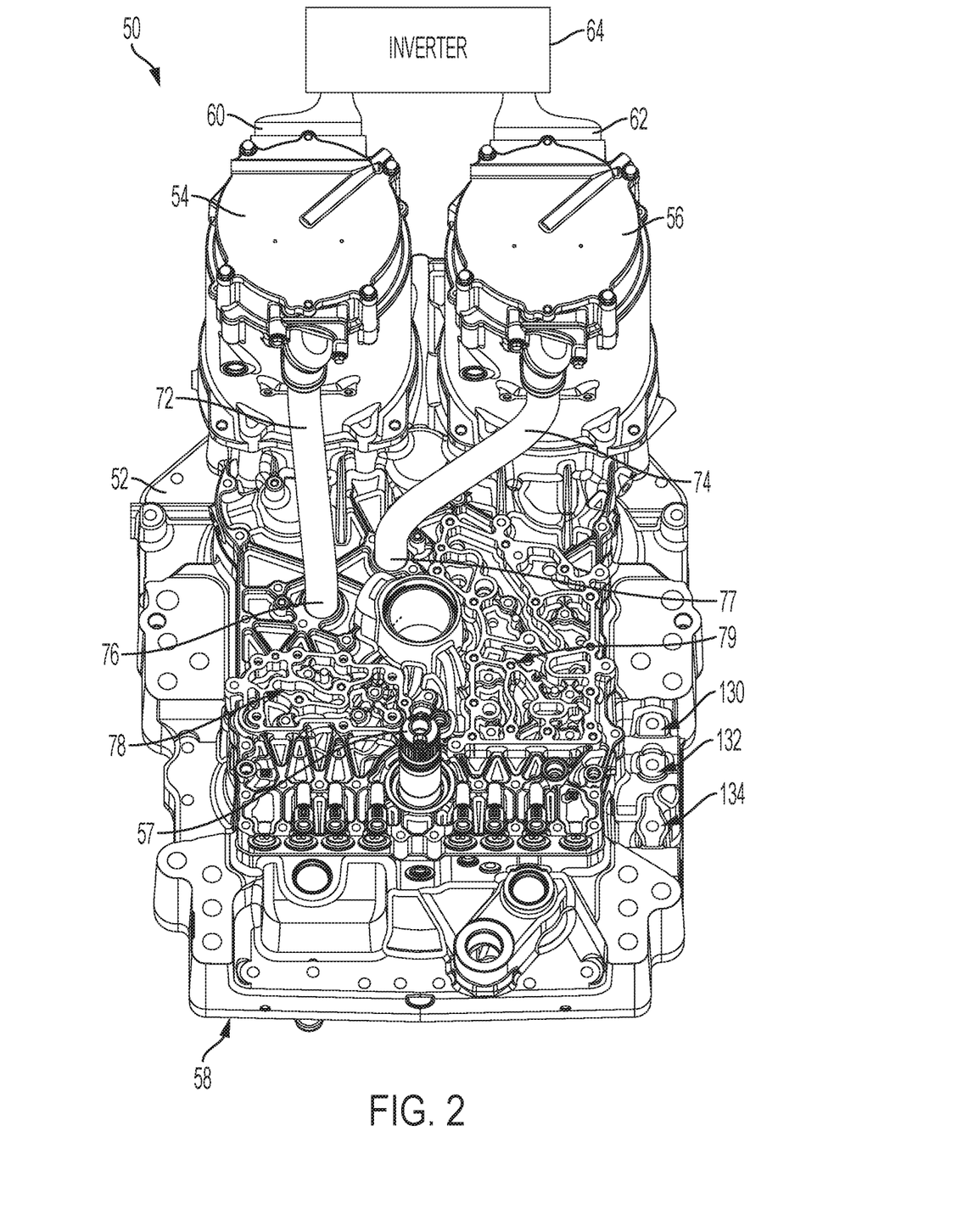
FIG. 2 is a rear perspective view of an electric machine lubrication system.

FIG. 2 is a rear perspective view of an electric machine lubrication system 50 mounted to a transmission housing 52, also known as a manifold, which is configured to fluidically cooperate with an oil cooled electrical generator 54 and an oil cooled motor 56. While the term oil is used herein, cooling fluid and fluid are also contemplated. The transmission housing is configured to be mounted to the transmission of the vehicle 10 and includes an aperture through which a power take off (PTO) shaft 57 extends as would be understood by one skilled in the art. The transmission housing 52 is illustrated as positioned on the transmission such that a bottom portion 58 of the housing, as illustrated in FIG. 2 is located closest to ground and the side portions of the housing extend generally vertically from the bottom portion 58. Each of the oil cooled electrical generator 54 and the oil cooled motor 56 are fixedly coupled to the transmission housing 52 at an upper portion of the housing.

The generator 54 includes an electrical connector 60 and the motor 56 includes an electrical connector 62. An electrical inverter 64 is coupled to the connectors 60 and 62 such that power generated by the generator 54 is transmitted through the connector 60 to the inverter 64. The inverter 64 converts the generator power to a motor power sufficient to power the oil cooled motor 56. In other embodiments, the electrical generator directly generates a correct motor power to power the motor 56, and the inverter 64 is not needed. In other embodiments, an inverter is located in either the generator 54 or the motor 56 and only a cable extends from the generator 54 to the motor 56.

Each of the generator 54 and the motor 56 are oil cooled devices and receive oil from oil located in pressurized passages of the housing 52. The cavity 65 includes a primary sump 66, which is generally located in the cavity 65 toward the bottom 58 of the housing 52. During operation of the transmission, oil collects in the primary sump 66 to a generally predefined level due to the effects of gravity.

During operation of the transmission, the cavity 65 is not completely filled with oil. Pressurized passages located in the housing 52 provide a sufficient amount of oil to lubricate the generator 54 and the motor 62 to provide for cooling of both. The generator 54 includes a gear driven drive shaft 70 which is driven by the engine. The motor 56 includes a drive shaft operatively connected to the transmission.

The transmission housing 52 receives pressurized oil from a lubrication pump that is part of the lubrication system 50. The housing 52 includes a multitude of fluid passages to deliver the oil to supply ports of the generator 52 and the motor 54. The oil enters into the generator 54 from one of the fluid paths located in the housing 52 and flows through the generator 54 and out of the generator to a rear drain tube 72 as seen in FIG. 2.

In one embodiment, about half of the oil provided to the generator 52 drains from the rear drain tube 72 and the remaining amount of oil drains from an open face of the generator 52, through cavities in the manifold and rear cover to a secondary sump 80 which also receives oil from the rear drain tube 72. Similarly oil enters into the motor 56 by fluid passages located in the housing 52 in the same fashion as oil enters the generator 54. About half the oil flows through the motor 56 and out of the motor to a rear drain tube 74. The remaining amount enters the secondary sump 80 from an open face of the motor 56. Other amounts of oil are contemplated.

Each of the rear drain tubes 72 and 74 extends from their respective devices and are coupled respectively to the housing 52 at a first connection 76 and a second connection 77. The motor 56 includes the drive shaft 75 which is operatively connected to the transmission. The rotational speed of the shaft 75 controls the speed of the transmission as would be understood by one skilled in the art. The rotational speed of the shaft is commanded in different embodiments by the operator or by a semi-autonomous control systems of the vehicle. Using the commanded speed, the transmission selects a mode of operation and an electric motor speed to achieve the commanded speed.

An interface 78 and an interface 79 located on an exterior of the housing 52 and are used to control transmission functions, as is understood by those skilled in the art. Another interface includes ports 130, 132, and 134. One port is for supplying a control pressure flow from an external pump. A second port is for supplying a lube flow from a primary lubrication pump 126 (see FIG. 7). A third port is a control line leaving the transmission for other vehicle functions. In other embodiments, a single fluid cooler or more than two fluid coolers are contemplated.

Figure 3:
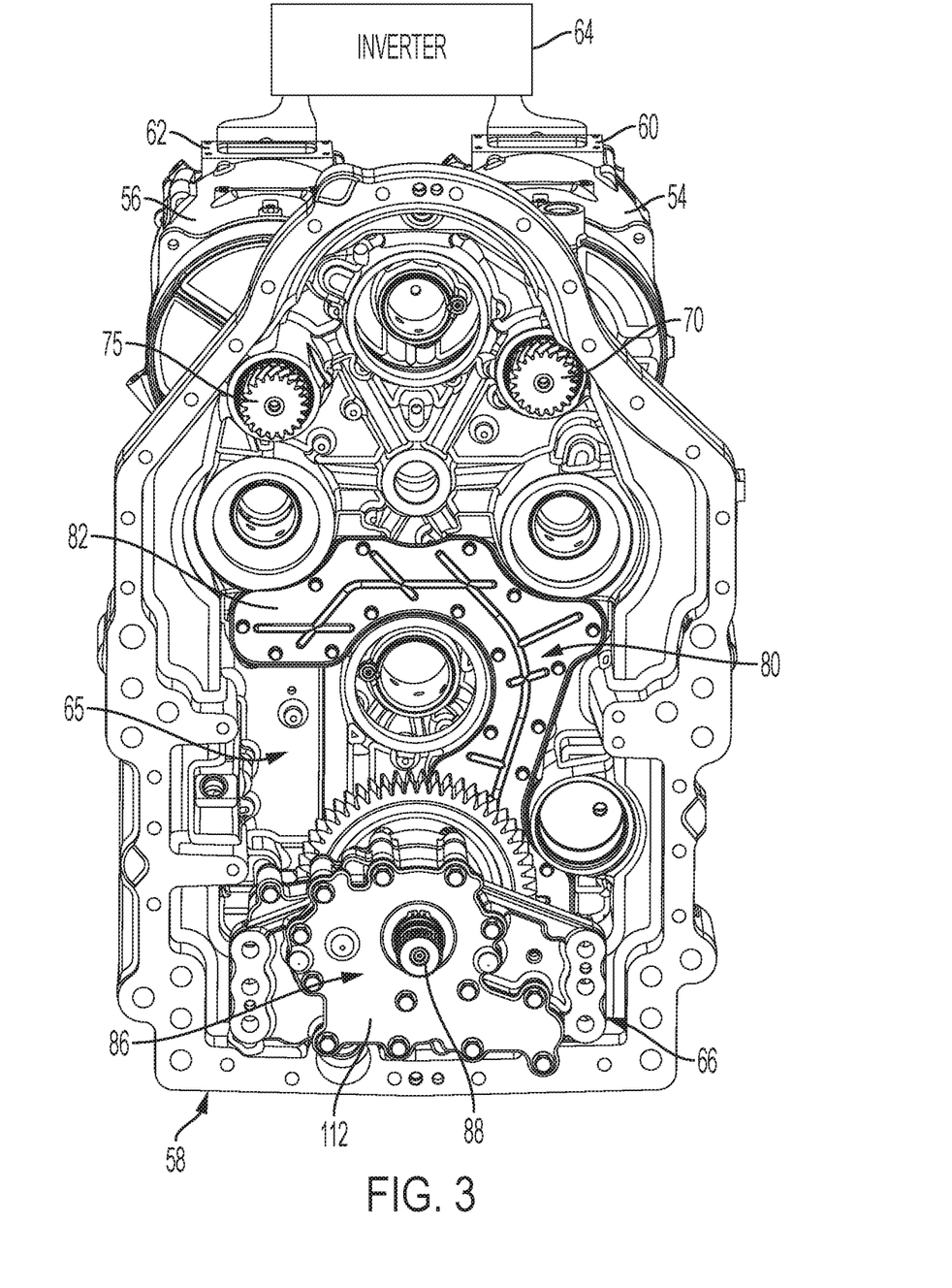
FIG. 3 is a front perspective view of an electric machine lubrication system.
Figure 4:
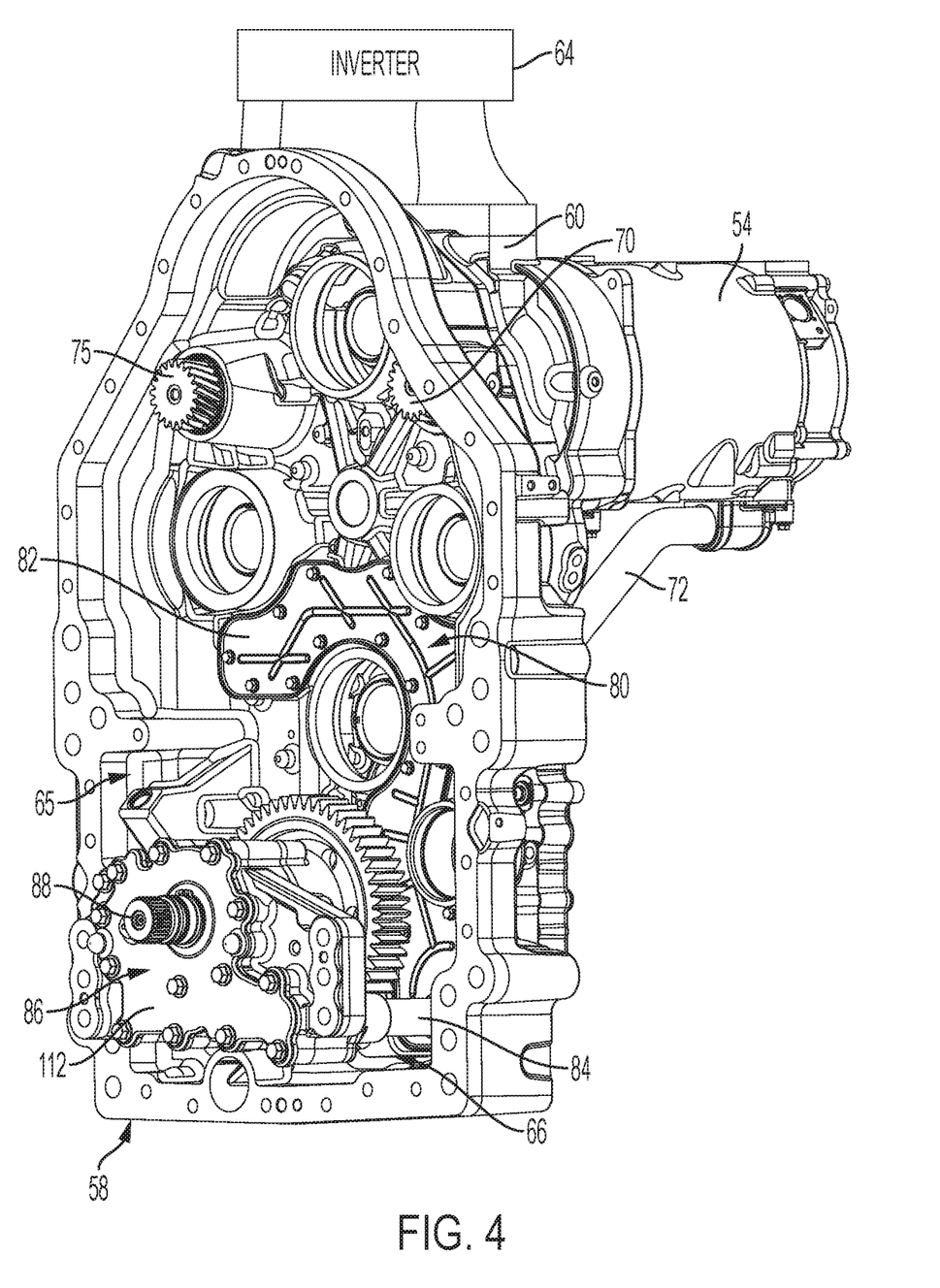
FIG. 4 is a side perspective view of an electric machine lubrication system.

Apertures extending through the housing 52 deliver oil from each of the generators by generator drain tube 72 and motor drain tube 74 to a secondary sump 80, as illustrated in FIG. 3. The secondary sump 80 is generally located in a central portion of the housing 52 and includes a cover or plate 82 that provides a wall to define the secondary sump 80 with the interior of the housing 52. As further seen in FIG. 4, the oil located in the secondary sump flows by the force of gravity between the plate 82 and the interior of the housing toward the bottom 58 of the housing where it collects between the plate 82 and the housing 52. A conduit 84, also known as a jumper tube, transfers the collected oil from the secondary sump 80 to a pumping apparatus 86, which in different embodiments includes one or more pumps including a scavenger pump and/or a recycle pump. A drive shaft 88 extends through the pumping apparatus 86 and in different embodiments is coupled to various implements for mechanically powering those implements. In one embodiment, the drive shaft 88 is coupled to a power take off shaft located at the front of the vehicle 10.

Figure 5:
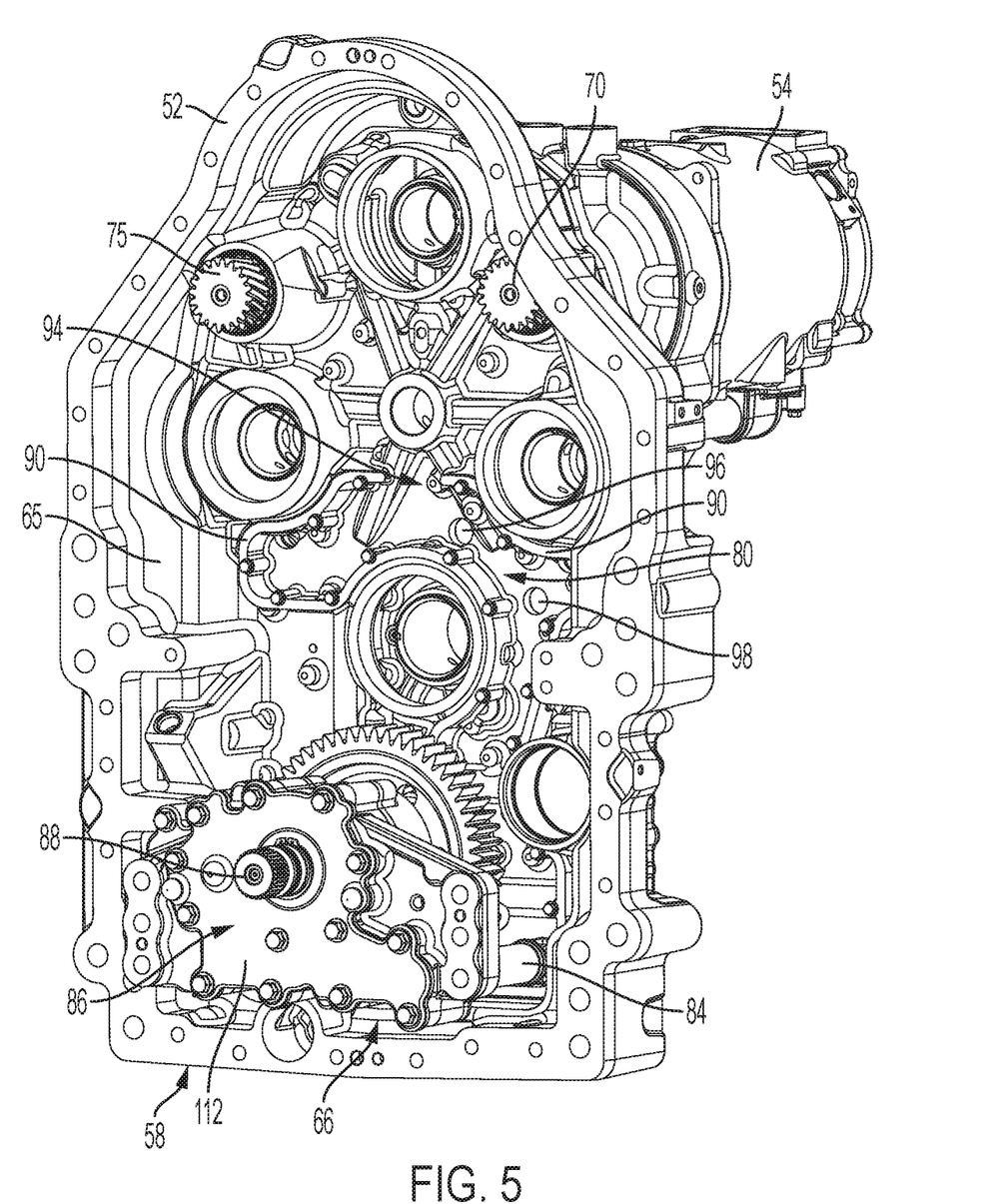
FIG. 5 is a side perspective view of an electric machine lubrication system.

FIG. 5 illustrates cavity 65 of the housing 52 with the plate 82 removed. The housing 52 includes raised features 90, such as ribs, extending from a back wall 92 of the housing 52 to define the secondary sump 80 in combination with the plate 82. The features 90 extend from a gap 94 toward the bottom of the housing 52. The features 90 in combination with the plate 82 direct fluid flow from an aperture 96 coupled to the motor drain tube 74 and direct fluid flow from an aperture 98 coupled to the generator drain tube 72. The fluid flow from each of the apertures 96 and 98 toward the conduit 84 where it is delivered to the pump apparatus 86. The rib 90 and the plate 82 combine to define a relatively fluid tight seal to keep oil from the generator and the motor within the cavity 65.

The gap 94 between the back wall 92 and the plate 82 provides an opening to enable fluid to be expelled or release from the secondary sump 80 into the interior of the housing as necessary. For instance, under certain conditions where the flow of oil from the generator drain tube 72 and the motor drain tube 74 exceeds the capacity of the secondary sump 80, fluid moves through the gap 94 and into the housing cavity 65.

Figure 6:
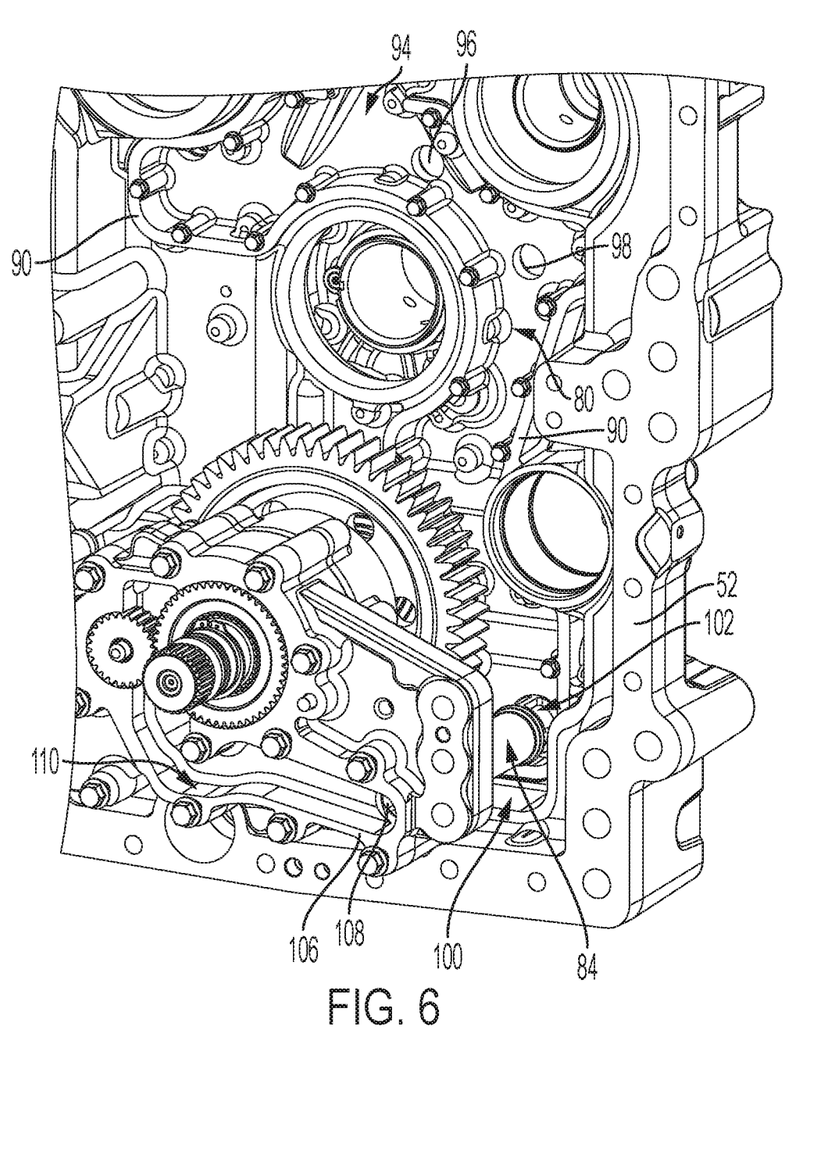
FIG. 6 is a side perspective view of a portion of the electric machine lubrication system of FIG. 5.

The secondary sump 80, as further illustrated in FIG. 6, includes a bottom portion 100, or collection location, where the fluid received through the apertures 96 and 98 collects. The conduit 84 includes an open end 102 that receives the fluid to movement through a tube 84. The tube 84 is operatively connected to a pump apparatus housing 106 that includes an aperture 108 coupled to the tube 104. The housing 106 includes a channel 110 configured to deliver the oil to the one or more pumps being driven by the pump apparatus 86. A cover 112 (see FIG. 5) has been removed to illustrate the interior of the housing 106. The bottom portion of the secondary sump 100 does not include an aperture and consequently, fluid located in the secondary sump 80 does not enter into the primary sump 66, unless the fluid escapes from the gap 94.

Figure 7:
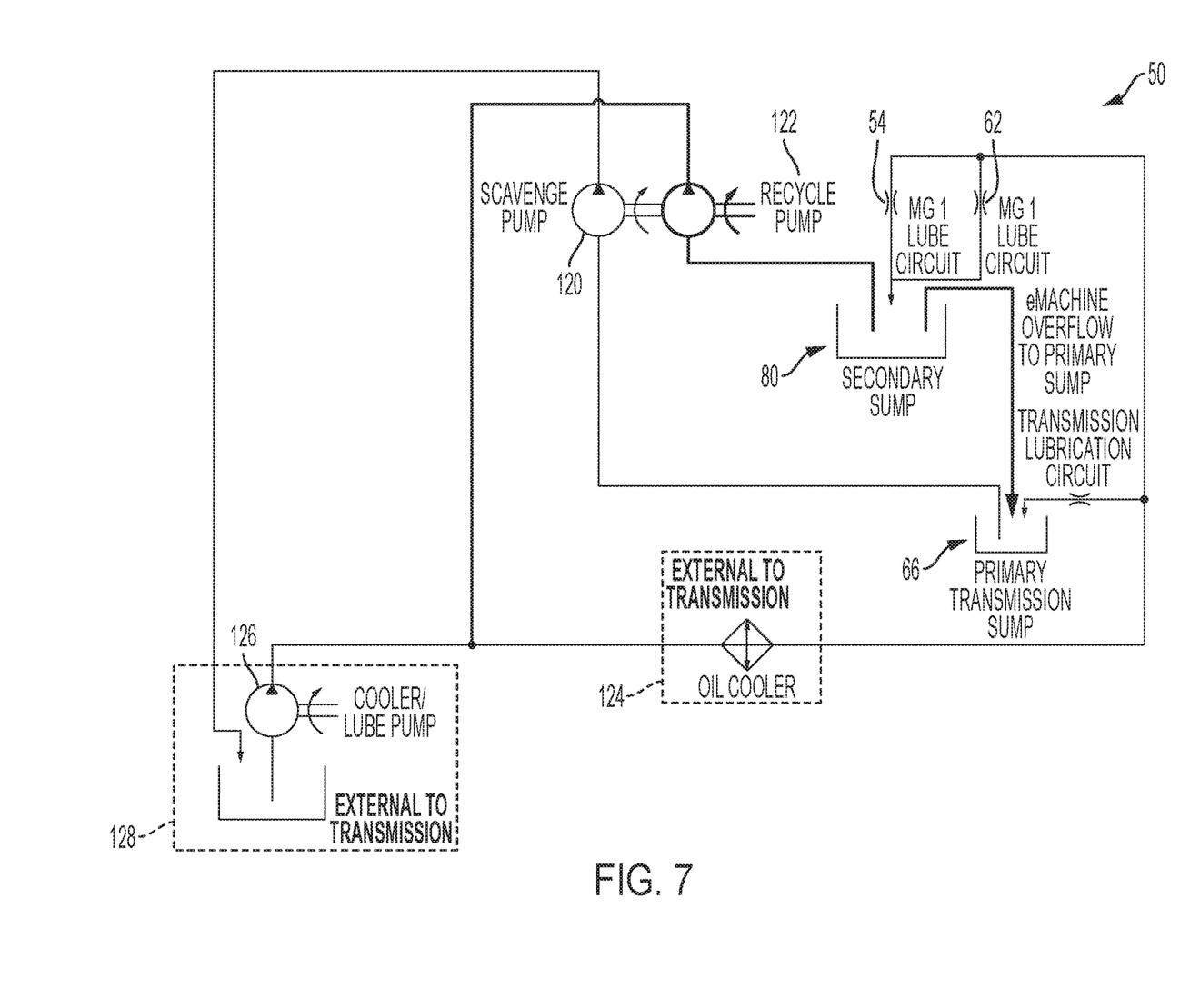
FIG. 7 is a system flow diagram of an electric machine lubrication system.

FIG. 7 illustrates a system flow diagram of the electric machine lubrication system 50. The system 50 includes the primary sump 66 which is fluidically coupled to the secondary sump 80 resulting from fluid overflow at the overflow gap 94. The primary sump 66 provides fluid for the transmission lubrication circuit which is provided to both the oil cooled generator 54 and to the oil cooled motor 56. In FIG. 7, the labels MG1 and MG2 are used to indicate motor/generator. In different embodiments, reversed locations of the motor and generator are contemplated. In other embodiments, however, the two electronic machines (eMachines), the generator 54 and the motor 56, are configured to provide both functions of electrical power generation and mechanical power generation.

Oil that has moved to the secondary sump 80 is delivered to a scavenger pump 120 and to a recycle pump 122 that are part of the pump apparatus 86 as described herein. The fluid pumped by each of the pumps 120 and 122 are provided to the fluid circuit where the fluid is cooled by an oil cooler 124 which is located external to the transmission. A cooler/lube pump 126 and an associated sump 128 are located externally to the transmission to provide fluid to various lubrication circuits as would be understood by one skilled in the art.

While exemplary embodiments incorporating the principles of the present disclosure have been described hereinabove, the present disclosure is not limited to the described embodiments. Instead, this application is intended to cover any variations, uses, or adaptations of the disclosure using its general principles. In addition, while the terms greater than and less than have been used in making comparison, it is understood that either of the less than or greater than determines can include the determination of being equal to a value. Further, this application is intended to cover such departures from the present disclosure as come within known or customary practice in the art to which this disclosure pertains and which fall within the limits of the appended claims.

The invention claimed is:

1. An electric drive for a transmission operatively connected to a vehicle engine, the electric drive comprising:
   an oil-cooled electric generator including an input drive configured to be driven by the engine, an electrical output configured to provide generator electrical power, and a generator oil output configured to deliver a flow of oil from the electrical generator;
   an oil-cooled electric motor including a motor input, a motor driver configured to provide a mechanical power, and a motor oil output configured to deliver a flow of oil from the electric motor; and
   a housing including a first aperture operatively connected to the generator oil output and a second aperture operatively connected to the motor oil output, wherein the housing includes a chamber operatively connected to the first aperture and to the second aperture, and a chamber output operatively connected to a pump drive, wherein the pump drive is configured to drive one or more pumps for a lubrication circuit of the transmission.

2. The electric drive of claim 1 further comprising an inverter including an inverter electrical input and an inverter electrical output, wherein the inverter converts the generator electrical power to inverter electrical power, the inverter electrical output operatively connected to the electric motor to provide inverter electrical power to the electric motor.

3. The electric drive of claim 2 wherein the electric motor includes a drive shaft configured to be operatively connected to the transmission, wherein a rotational speed of the drive shaft provides a speed control for the transmission.

4. The electric drive of claim 1 wherein the housing defines a cavity in which the chamber is located, wherein the chamber defines a primary sump and the cavity defines a secondary sump.

5. The electric drive of claim 4 wherein the housing includes an interior wall and an exterior wall, and further comprises a cover fixedly connected to the interior wall to define the secondary sump.

6. The electric drive of claim 5 wherein the interior wall of the housing includes a rib and the cover is fixedly connected to the rib to define the secondary sump.

7. The electric drive of claim 6 wherein the rib and the cover define an opening, wherein the opening is configured to provide for the release of oil from the generator oil output and motor oil output into the cavity.

8. The electric drive of claim 7 wherein the rib and the cover define a substantially fluid tight seal configured to direct the generator oil output and the motor oil output to a collection location of the secondary sump.

9. The electric drive of claim 8 further comprising a conduit operatively connected to the secondary sump at the collection location, wherein the conduit is configured to direct the collected oil from the sump.

10. A work vehicle comprising:
    an engine;
    a transmission operatively connected to the engine, the transmission including a housing including a first aperture, a second aperture, and a chamber; and
    an electric drive operatively connected to the housing, the electric drive including: i) an oil-cooled electric generator having an input drive configured to be driven by the engine, an electrical output configured to provide generator electrical power, and a generator oil output configured to deliver a flow of oil from the electric generator; and ii) an oil-cooled electric motor including a motor input, a motor driver configured to provide mechanical power, and a motor oil output configured to deliver a flow of oil from the electric motor; wherein the first aperture is operatively connected to the generator oil output and the second aperture is operatively connected to the motor oil output, wherein the chamber is operatively connected to the first aperture and to the second aperture, and a chamber output is operatively connected to a pump drive, wherein the pump drive is configured to drive one or more pumps for a lubrication circuit of the transmission.

11. The work vehicle of claim 10 wherein the electric drive includes an inverter having an inverter electrical input and an inverter electrical output, wherein the inverter converts the generator electrical power to inverter electrical power, the inverter electrical output operatively connected to the electric motor to provide inverter electrical power to the electric motor.

12. The work vehicle of claim 11 wherein the electric motor includes a drive shaft configured to be operatively connected to the transmission, wherein a rotational speed of the drive shaft provides a speed control for the transmission.

13. The work vehicle of claim 10 wherein the housing defines a cavity in which the chamber is located, wherein the chamber defines a primary sump and the cavity defines a secondary sump.

14. The work vehicle of claim 13 wherein the housing includes an interior wall and an exterior wall, and further comprises a cover fixedly connected to the interior wall to define the secondary sump.

15. The work vehicle of claim 14 wherein the interior wall of the housing includes a rib and the cover is fixedly connected to the rib to define the secondary sump.

16. The electric drive of claim 15 wherein the rib and the cover define an opening, wherein the opening is configured to provide for the release of oil from the generator oil output and motor oil output into the cavity.

17. The electric drive of claim 16 wherein the rib and the cover define a substantially fluid tight seal configured to direct the generator oil output and the motor oil output to a collection location of the secondary sump.

18. The electric drive of claim 17 further comprising a conduit operatively connected to the secondary sump at the collection location, wherein the conduit is configured to direct the collected oil from the sump.

19. A method for controlling the speed of an infinitely variable transmission having a housing, a pump drive, and a primary sump configured to hold oil, the method comprising:

providing an oil cooled electric generator operatively connected to the housing and an oil cooled motor operatively connected to the housing, the electric generator having a generator oil output configured to deliver a flow of oil from the electric generator to the housing and an electrical output operatively connected to the oil cooled motor, the oil-cooled electric motor having a motor oil output configured to deliver a flow of oil from the electric motor and a drive shaft extending into the housing;

connecting the generator oil output to a first aperture of the housing and connecting the motor oil output to a second aperture of the housing;

providing a chamber within the housing operatively connected to the first aperture and to the second aperture, the chamber including a chamber output operatively connected to the pump drive;

delivering a flow of oil into the chamber from the first aperture and the second aperture, wherein the delivered flow of oil is separated from the primary sump; and controlling the speed of the drive shaft to control the speed of the infinitely variable transmission.

20. The method of claim 19 further comprising releasing a portion of the oil from the chamber into the primary sump during operation of the infinitely variable transmission.

* * * * *

UNITED STATES PATENT AND TRADEMARK OFFICE
CERTIFICATE OF CORRECTION

| | | |
|---|---|---|
| PATENT NO. | : 10,948,070 B2 | Page 1 of 1 |
| APPLICATION NO. | : 16/188999 | |
| DATED | : March 16, 2021 | |
| INVENTOR(S) | : Kuhl et al. | |

It is certified that error appears in the above-identified patent and that said Letters Patent is hereby corrected as shown below:

On the Title Page

Item (72), add the following Inventor:
-- David G. Reid, Cedar Falls, IA (US) --

Signed and Sealed this
Twenty-sixth Day of December, 2023

Katherine Kelly Vidal
*Director of the United States Patent and Trademark Office*